INVENTOR.
HANS THIEME
BY ERWIN von WASIELEWSKI

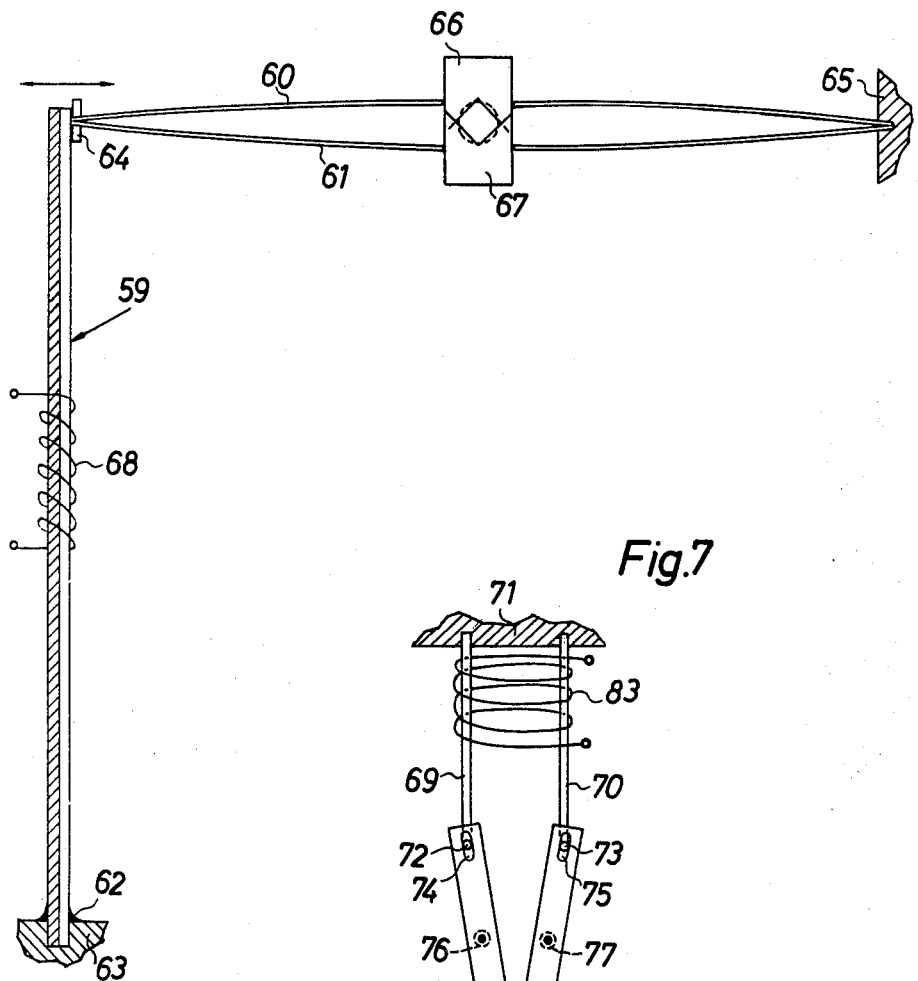

INVENTOR.
HANS THIEME
BY ERWIN von WASIELEWSKI

United States Patent Office 3,518,930
Patented July 7, 1970

3,518,930
CAMERA LIGHT CONTROL ARRANGEMENT
Hans Thieme and Erwin von Wasielewski, Munich, Germany, assignors to Firma Agfa-Gevaert Aktiengesellschaft, Leverkusen, Germany
Filed Feb. 16, 1968, Ser. No. 706,035
Claims priority, application Germany, Feb. 23, 1967, A 54,988
Int. Cl. G01j *1/00;* G02f *1/30;* G03b *9/02*
U.S. Cl. 95—64                                    11 Claims

ABSTRACT OF THE DISCLOSURE

An arrangement for controlling the light exposure in photographic cameras. An electrical circuit having a light-sensitive element produces a current which is a function of the prevailing light conditions. The current is applied to an electrophysical responsive member having either magnetostrictive or electrostrictive properties. As a result of the signal applied by the electrical circuit to the electrophysical responsive member the latter undergoes a dimensional change which is translated to a diaphragm member mechanically linked to the electrophysical responsive member. The diaphragm of the camera is, as a result, increased or decreased, in opening which serves to constrict the light path in a predetermined manner. The dimensional change incurred by the electrophysical responsive member may be magnified through the application of lever arrangements or by connecting mechanically a number of such electrophysical responsive members in series. In this case these members are connected to each other end-to-end and the dimensional change of each member is added to the changes of all other members. Compensating mediums may also be included so as to compensate for any dimensional changes of the electrophysical responsive member resulting from thermal effects.

BACKGROUND OF THE INVENTION

In recent times rotary coil systems have been extensively applied for the direct operation of shutter or diaphragm blades. When such an arrangement is used for the purpose of diaphragm control, the rotary coil system is supplied with continuous current which is a function of the prevailing light conditions. When, on the other hand, the arrangement is used in conjunction with diaphragm shutters, the rotary coil system is supplied with current pulses which vary as a function of the prevailing light conditions. Such rotary coil systems, however, are relatively complex from the structural design point of view and require precision manufacture. These disadvantages coupled with the requirement that lengthy manufacturing time is involved, have an undesirable effect upon the price of the product.

For these reasons, several arrangements were designed in which the rotary coil systems were replaced by electromagnetic systems of simple construction. As a result the application of pot-shaped magnets and plunger type magnets became known. However, even such systems, have precision requirements in several aspects.

All of these electromagnetic systems which work in conjunction with a shutter or diaphragm control, have in common a predetermined amount of inertia. Such inertia characteristics lead to difficulties when operating in regions of short exposure times. A further disadvantage of such systems resides in the condition that their efficiencies during operation are relatively long.

Accordingly, it is an object of the present invention to provide an arrangement for diaphragm or exposure control and having high operating efficiency accompanied by low inertia characteristics.

It is also an object of the present invention that the latter be of sturdy construction and economical from the manufacturing point of veiw.

The objects of the present invention are achieved by providing a positioning member made of material having either magnetostrictive or electrostrictive properties. When operating in conjunction with a current circuit at least one diaphragm blade is positioned in the exposure light path of the camera.

In accordance with one embodiment of the present invention, the positioning member is rod-shaped and acts upon at least one flexible carrying member upon which a diaphragm blade is mounted perpendicular to a direction of motion of the blade. For purposes of increasing or magnifying the displacement of the positioning member, several such positioning members may be coupled in series or in sequence.

In one embodiment of the present invention a lever arrangement is provided between a positioning member and the carrying arms for purposes of magnifying the displacement.

In accordance with a further embodiment of the present invention at least one element is applied for purposes of compensating against thermal expansion of the positioning member and the carrying member. Such compensation also applies when a plurality of positioning members are used.

An arrangement with particularly magnified displacement is realized when the positioning member is constructed of two flexible strips of material having different magnetostrictive properties.

In a further embodiment of the present invention at least one rotary carrying member is provided with a control slot. A free end of the positioning member is provided with a pin extending into this control slot.

SUMMARY OF THE INVENTION

An arrangement for controlling the exposure operation in cameras.—An electrical circuit within the camera contains a light sensitive element from which an electrical current is derived as a function of the prevailing light which strikes the camera. The camera has a diaphragm mechanism for constricting the light path depending upon the intensity of the prevailing light. An electro-physical responsive member having magnetostrictive or electrostrictive properties, is mechanically linked to the diaphragm mechanism. The electrical circuit containing the light sensitive element, on the other hand, is connected to the electro-physical responsive member. The electrical current derived from the electrical circuit has a function of the prevailing light, is applied to the electro-physical responsive member so that the latter incurs a dimensional change. This dimensional change either in the form of an elongation or a shortening of the electro-physical responsive member, is translated in a corresponding positional change of the diaphragm mechanism. The change in the position of the diaphragm results in a change of the constriction of the light path. This constriction of the light path is made, therefore a function of the elerical current derived from the light sensitive element within the electrical circuit.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawings.

BRIEF DESCRIPTION OF THE DRAWING

FIG. 6 is a functional schematic diagram and shows an embodiment for changing the position of the diaphragm in cameras, in accordance with the present invention, in which the positioning member of FIG. 5 is used;

FIG. 7 is a further embodiment, in accordance with the present invention, in which two positioning members of FIG. 5 are used for the purpose of producing a positional change in the diaphragm mechanism;

DESCRIPTION OF THE PREFERRED EMBODIMENTS

Figure 1:
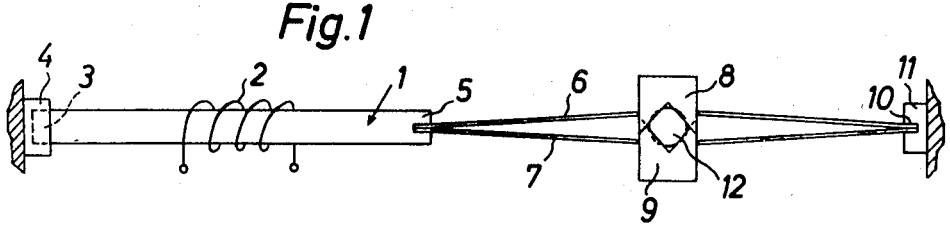
FIG. 1 is a functional schematic diagram showing the arrangement of the present invention in which the member for positioning the diaphragm mechanism is made of magnetostrictive material.

Referring to the drawing and in particular to FIG. 1, a positioning member 1 is made of magnetostrictive material, and is surrounded by a coil 2. A material having magnetostrictive properties can, for example, be made of an alloy containing 50% iron and 50% nickel. When a magnetic field is applied to such an alloy a positive magnetostriction occurs, implying an increase in the length of the member 1. Pure nickel exhibits negative magnetostriction.

The positioning member 1 is firmly embedded in a support 4 with its end 3. Two flexible and movable carrying arms 6 and 7 are secured to the end 5 of the member 1. Shutter diaphragm blades 8 and 9 are mounted on the carrying arms 6 and 7. The latter are also secured, at their other end 10, in a support 11. Both diaphragm blades 8 and 9 are arranged about an objective lens 12.

If a current which varies as a function of the prevailing light goes through the coil 2 the positioning member 1 will increase in length depending on the magnitude of the magnetization. When the member 1 thus increases in length the arms 6 and 7 spread, and thereby increase the opening through the diphragm blades 8 and 9. As a result, the opening associated with the objective lens 12 becomes dependent upon the magnitude of the current through the coil 2 which is, in turn, dependent upon the intensity of the prevailing light.

If the positioning member 1 is made of material having negative magnetostriction, then the member 1 will become shorter in length upon the application of a magnetic field through the flow of current in the coil 2. With such an arrangement, the flexible arms 6 and 7 are fully spread apart when in their non-operating state, so that the diaphragm blades are completely open. When the positioning member 1 becomes shortened in length, the diaphragm blades move in the closing direction and there- by limit the exposure area through the objective lens 1, depending upon the magnitude of magnetization of the member 1.

If a continuous current which is dependent upon the prevailing light intensity, flows through the coil 2, the arrangement in accordance with FIG. 1 can be used for shutter diaphragm control. When the arrangement is driven through current pulses of varying height and duration as a function of the prevailing light intensity, such an arrangement may be operated as a diaphragm shutter. In this case, the positioning member 1 is preferably made of material having positive magnetostrictive properties. In the non-operating state, corresponding to the state when the coil 2 is not energized, the flexible arms 6 and 7 are bent so that the diaphragm blades 8 and 9 inhibit the transmission of light through the objective lens 2. If, now, a current pulse is applied to the coil 2, the two diaphragm blades 8 and 9 open and attain an opening position corresponding to the magnitude of the current pulse and the elongation of the member 1. When the current flow through the coil 2 ceases, the diaphragm blades 8 and 9 become closed again.

An arrangement of the preceding description has the particular desirable advantage of having almost no inertia. Furthermore, the arrangement has the desirable property of being able to translate the amplitude and wave form of electrical pulses into corresponding diaphragm motion. As a result, very short shutter times may be realized. Such an arrangement, moreover, is sturdy and may be produced economically.

Figure 2:
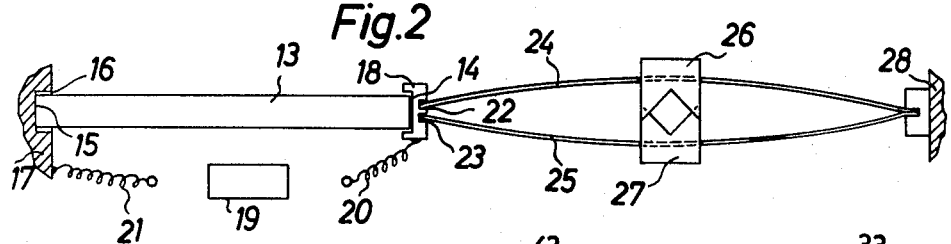
FIG. 2 is another embodiment of the arrangement of FIG. 1 in which the member for positioning the diaphragm mechanism is made of electrostictive material.

In the embodiment of FIG. 2, an arrangement is shown in which the positioning member 13 is made of material having electrostrictive properties. The rod or bar-shaped member 13 is provided with an electrical conducting layer at both of its ends 14 and 15. At one end, the member 13 is held within a recess 16 of a support 17. The latter is also constructed of electrically conducting material. Its other end, the member 13 is held within a supporting plate 18 which is similarly constructed of conductive material. A control circuit 19 is connected, via the connecting lines 20 and 21, to the supporting plate 18 and support 17, respectively. In accordance with this arrangement, an electrical voltage signal may be applied to the end surfaces 14 and 15 of the positioning member 13.

Among the materials known to have electrostrictive effects, are quartz and rochelle salt. Aside from these materials whose electrostrictive properties have been known for some time, new materials have become known, which have properties that exhibit a larger effect. An example of such material is a compound of lead and zirconium. The lens of the positioning member 13 varies with the application of a voltage to both of the ends 14 and 15. Depending upon the polarity of the applied voltage, the member 13 may either increase in length or decrease in length. The mounting or supporting plate 18 is provided with two slots 22 and 23 into which are inserted the ends of the carrying arms 24 and 25. The diaphragm blades 26 and 27 are mounted onto the carrying arms 24 and 25. The latter are supported, at their other end, by the fixed support 28.

The functional operation of this arrangement is similar to that described in relation to FIG. 1 and is adaptable to either diaphragm control or a diaphragm shutter. The basic difference between the arrangement of FIG. 2 and that of FIG. 1 resides in the condition that the positioning member 13 is made of electrostrictive material to which a voltage, as a function of light intensity is applied to the ends 14 and 15. If a continuous voltage is used, the arrangement in accordance with FIG. 2 is adaptable to diaphragm control. When on the other hand, the applied voltage is of relatively short duration, than the arrangement is adaptable to diaphragm shutter operation.

Figure 3:
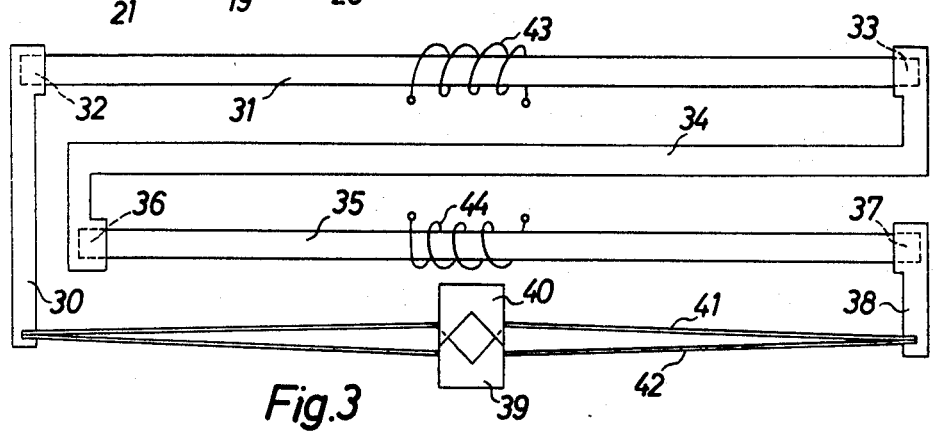
FIG. 3 is a function schematic diagram and shows an embodiment, in accordance with the present invention, in which a plurality of magnetostrictive positioning members, shown in FIG. 1 are mechanically coupled in series for producing a positional change in the diaphragm of the camera.

FIG. 3 shows an embodiment in which two positioning members made of magnetostrictive material are combined in sequence. A magnetostrictive positioning member 31 is held by its end 32 in a support 30. The other end 33 of the member 31 is secured to an intermediate member 34. A second positioning member 35 is also held, by its end 36, in the intermediate member 34. The two positioning members 31 and 35 are situated adjacent to each other. The other end 37 of the positioning member 35 resides in a supporting plate 38. Two flexible carrying arms 41 and 42 are mounted at one end in the support 30, and at the other end in the supporting plate 38. Diaphragm blades 39 and 40 are mounted upon the carrying arms 41 and 42. The intermediate member 34 is preferably made of material which compensates for the thermal effects as, for example, elongation, of the magnetostrictive positioning members 31 and 35. The positioning members 31 and 35 are surrounded by coils 43 and 44, respectively. These coils have applied to them currents which vary as a function of the prevailing light intensity.

Depending upon whether the coils 43 and 44 have applied to them continuous current or current pulses of varying amplitude and duration, the embodiment of FIG. 3 may be used for either diaphragm control or diaphragm shutter operation.

Figure 4:
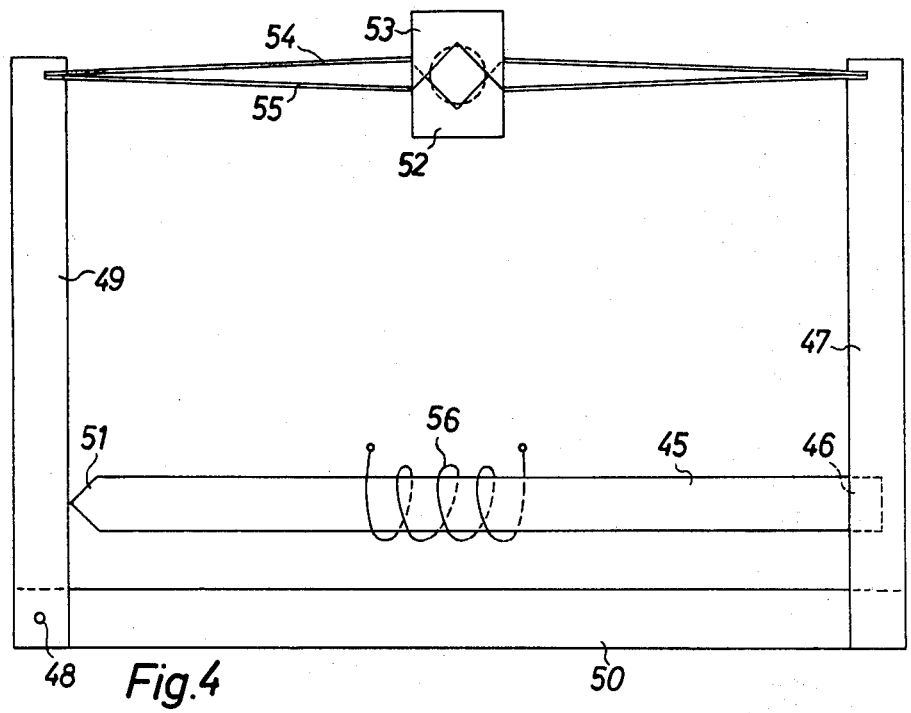
FIG. 4 is a functional schematic diagram and shows an embodiment, in accordance with the present invention, in which a lever is included for magnifying the dimensional change in the member made of magnetostrictive material.

In the embodiment of FIG. 4, the displacement of a magnetostrictive positioning member is magnified by means of a lever arrangement. The magnetostrictive positioning member 45 is held, at its end 46, in a support 47. A lever 49 is rotatably mounted upon pin 48 secured to the intermediate member 50. The other end of the intermediate member 50 is secured to the support 47. The intermediate member 50 is preferably made of material which compensates for the thermal elongation of the positioning member 45. The positioning member 45 acts upon the lever 49 with its end 51. Two flexible carrying arms 54 and 55 are secured, at one end, to the rotatable lever 49. Diaphragm blades 52 and 53 are mounted upon the carrying arms 54 and 55. The latter are supported at their other end by the supporting member 47.

A coil 56 surrounds the positioning member 45. The resetting force applied by the spring loaded diaphragm carrying arms 54 and 55 cause the lever 49 to be always pressed against the end 51 of the positioning member 45. A change in the length of the positioning member 45 produces a rotation of the lever 49 about the supporting pin 48. Depending upon the magnetostrictive characteristic of the member 45, the diaphragm blades 52 and 53 will, as a result, move in either the opening or closing direction. Similarly to the embodiments described above, the arrangement of FIG. 4 can be used for either diaphragm control or diaphragm shutter operation.

Figure 5:
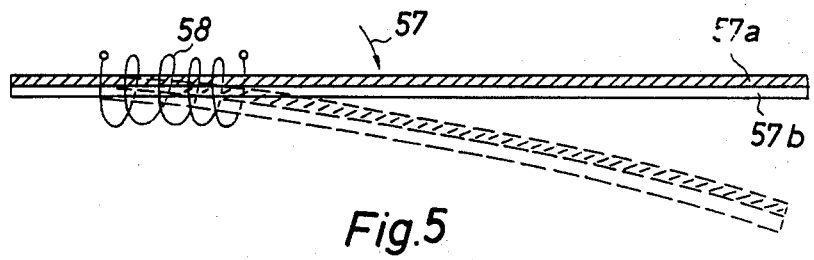
FIG. 5 is a functional schematic diagram and shows the construction of a positioning member when made of two different materials having magnetostrictive properties.

In the embodiment of FIG. 5, a positioning member 57 is shown which is composed of two different materials 57a and 57b having different magnetostrictive properties. The two materials are preferably shaped in the form of strips and are joined together by, for example, a rolling process. It is, furthermore, desirable that one material exhibits maximum positive magnetostrictive effects, whereas the other material exhibits maximum possible negative magnetostrictive effects. In this manner, it is possible to realize a large displacement from such bimetallic strips. A coil 58 surrounds the positioning member 57.

FIG. 6 shows an embodiment in which a positioning member 59 designed in accordance with the arrangement of FIG. 5, acts upon two carrying arms 60 and 61. The positioning member 59 is firmly secured in a support 63 at its end 62. At its other end, the positioning member 59 carries a supporting plate 64 for receiving the ends of the carrying arms 60 and 61. The other ends of the carrying arms 60 and 61 are held and secured by the support 65. The two diaphragm blades 66 and 67 which are mounted upon the carrying arms 60 and 61, are either moved in the opening or closing direction, depending upon the bending or flexing of the positioning member. The bending or flexing of the positioning member 59 is produced by the magnetic field generated by the coil 68. This arrangement, of FIG. 6 is also adaptable to either diaphragm control or diaphragm shutter operation in a manner similar to that described supra.

In FIG. 7 an embodiment is shown in which two positioning members 69 and 70 are designed on the basis of the construction of FIG. 5. The positioning members 69 and 70 are securely held, at one end, by the support 71. At their other ends, these positioning members 69 and 70 carry pins 72 and 73, respectively. The pins 72 and 73 extend within slots 74 and 75 respectively, of the diaphragm blades 78 and 79. The latter are rotatably mounted about bearings 76 and 77, respectively. The diaphragm blades 78 and 79 have cutouts 80 and 81 for the purpose of limting the opening to the objective lens 82. The positioning members 69 and 70 are surrounded by a coil 83. When current is applied to the latter, a bending or flexing of the two positioning members 69 and 70 results. This arrangement of FIG. 7 is also applicable for diaphragm control or diaphragm shutter operation depending upon whether a continuous current is supplied to the coil 83 or a current pulse.

Figure 8:
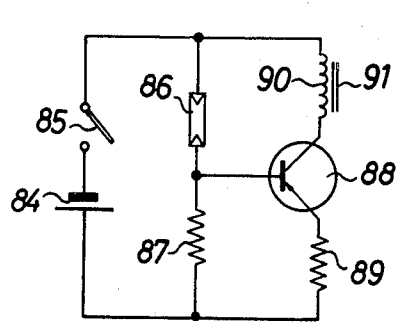
FIG. 8 is an electrical circuit diagram for producing an electrical current as a function of the prevailing light conditions applicable to the camera.

FIG. 8 shows a circuit arrangement for obtaining current which is a function of the light intensity. A battery 84 is connected in series with a switch 85. The latter is actuated by the camera release mechanism, not shown. When the camera release mechanism is depressed, the circuit to the battery through the switch 85 is closed. Through means of a light-sensitive element 86 and a fixed resistor 87, the base potential of a transistor 88 is established. A fixed resistor 89 is connected within the emitter circuit of the transistor 88. A coil 90 is connected in the collector circuit of the transistor 88. The coil 90 acts upon a positioning member 91 which is made of magnetostrictive material. The base potential of the transistor 88 corresponds to the light intensity impinging upon the light sensitive receiving element 86. Accordingly, the current flowing through the coil 90 is representative of the prevailing light conditions.

Figure 9:
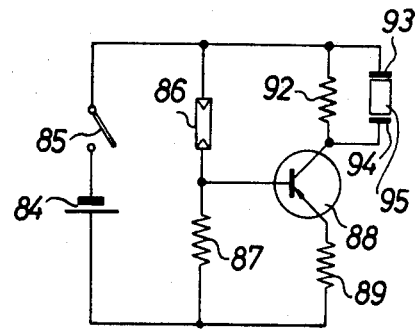
FIG. 9 is an electrical circuit diagram for producing a voltage as a function of the prevailing light conditions applicable to the camera.

FIG. 9 shows a variation of the circuit of FIG. 8 for the purpose of operating or influencing a positioning member which is made of electrostrictive material. A fixed resistor 92 is connected in the collector circuit of the transistor 88. A positioning member 95 made of electrostrictive material is connected in parallel with the fixed resistor 92. The positioning member 95 is situated between the two contact plates 93 and 94. The voltage drop across a fixed resistor 92 is, again, a function of the light intensity. As a result, the variation in the length of the positioning member 95 corresponds to the instantaneous prevailing light conditions. Both of the circuits of FIGS. 8 and 9 can be used when the arrangements of FIGS. 1, 2, 3, 4, 6, 7 and 8 are applied for the purpose of diaphragm control.

Figure 10:
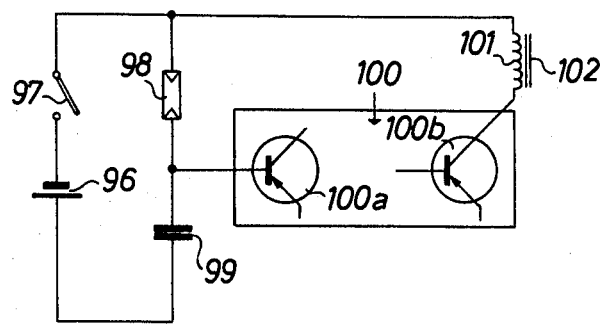
FIG. 10 is an electrical circuit diagram for producing current pulses as a function of the prevailing light conditions applicable to the camera.

FIG. 10 shows an embodiment of a circuit which may be used for the purpose of adapting the arrangements to diaphragm shutter operation. The circuit of FIG. 10 is also adaptable for exercising pure time control. A switch 97 actuated by the release mechanism of the camera, not shown, is connected in series with a battery 96. The switch 97 becomes closed and connects the battery to the circuit when the release mechanism of the camera is depressed. Connected in parallel with the battery 96 is an RC network consisting of a light sensitive pick-up element 98 and a capacitor 99. The base of a transistor 100a is connected to the junction of the light sensitive element 98 and the capacitor 99. The transistor 100a operates in conjunction with the transistor 100b to form a switching stage. For purposes of clarity and maintaining the drawing simple, the exact reproduction of a conventional circuit for such a switching stage has been omitted. A coil 101 is connected in the emitter path of the transistor 100b. When energized, this coil 101 acts upon a positioning member 102 made of magnetostrictive material. When the switch 97 is closed, current flows through the transistor 100b. As a result of the corresponding current flow through the coil 101, the positioning member 102 causes the shutter diaphragm blades to become opened. During this stage of the transistor 100b the transistor 100a is cut off. The duration of the opening time or exposure time of the diaphragm shutter is determined by the charging time of the capacitor 99. The charging time of this capacitor, on the other hand, is dependent upon the prevailing light conditions. Thus, the charging time of the capacitor 99 may be less or more, so that the voltage by which the transistor 100a becomes turned on is achieved sooner or later. Accordingly, when the capacitor 99 has been charged to a predetermined value the base voltage of transistor 100a is at a level at which the transistor becomes conductive. When this latter condition in which transistor 100a is turned on occurs, the transistor 100b becomes cut off and the positioning member 102 is returned to its non-operative position.

It will be understood that each of the elements described above, or two or more together, may also find a useful application in other types of light control arrangements in photographic cameras, differing from the types described above.

While the invention has been illustrated and described as embodied in light control arrangements in photographic cameras, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for controlling the exposure means in cameras, comprising, in combination, diaphragm means located within the light path of said exposure means for constricting said light path; electrical circuit means sensitive to light and producing electrical current as a function of the light within said light path; and electrophysical responsive means connected to said circuit means and said diaphragm means and being responsive to electrophysical action resulting from said electrical current produced by said circuit means so that said electrophysical responsive means incurs a dimensional change as a function of said electrical current, whereby said dimensional change of said electrophysical responsive means produces a corresponding change in the position of said diaphragm means to constrict said light path as a function of said electrical current, said electrophysical responsive means being a plurality of rod-shaped members mechanically linked end-to-end for magnifying said dimensional change incurred by said electrophysical responsive means.

2. An arrangement for controlling the exposure means in cameras, comprising, in combination, diaphragm means located within the light path of said exposure means for constricting said light path; electrical circuit means sensitive to light and producing electrical current as a function of the light within said light path; electrophysical responsive means connected to said circuit means and said diaphragm means and being responsive to electrophysical action resulting from said electrical current produced by said circuit means so that said electrophysical responsive means incurs a dimensional change as a function of said electrical current, whereby said dimensional change of said electrophysical responsive means produces a corresponding change in the position of said diaphragm means to constrict said light path as a function of said electrical current; and compensating means mechanically connected between said electrophysical responsive means and said diaphragm means for compensating against a dimensional change in said electrophysical responsive means resulting from thermal effect.

3. An arrangement for controlling the exposure means in cameras, comprising, in combination, diaphragm means located within the light path of said exposure means for constricting said light path; electrical circuit means sensitive to light and producing electrical current as a function of the light within said light path; electrophysical responsive means connected to said circuit means and said diaphragm means and being responsive to electrophysical action resulting from said electrical current produced by said circuit means so that said electrophysical responsive means incurs a dimensional change as a function of said electrical current, whereby said dimensional change of said electrophysical responsive means produces a corresponding change in the position of said diaphagm means to constrict said light path as a function of said electrical current; at least one rotational member in said diaphragm means for constricting said light path, said rotational member having a slot; and a pin secured to said electrophysical responsive means and engaging said slot, said electrophysical responsive means being at one end and supporting said pin at its other end, whereby said pin incurs a displacement resulting from said dimensional change of said electrophysical responsive means and rotates thereby said rotational member in said diaphragm means for constricting said light path as a function of the dimensional change of said electrophysical responsive means.

4. An arrangement for controlling the exposure means in cameras, comprising, in combination, diaphragm means located within the light path of said exposure means for constricting said light path; electrical circuit means sensitive to light and producing electrical current as a function of the light within said light path; and electrophysical responsive means connected to said circuit means and mechanically linked to said diaphragm means and being responsive to electrophysical action resulting from said electrical current produced by said circuit means so that said electrophysical responsive means incurs a dimensional change as a function of said electrical current, whereby said dimensional change of said electrophysical responsive means is transmitted into a corresponding change in the position of said diaphragm means to constrict said light path as a function of said electrical current, said electrical current being directly converted into said dimensional change by being directly applied to said electrophysical responsive means.

5. The arrangement for controlling the exposure means in cameras defined in claim 4, wherein said electrophysical responsive means is a rod-shaped member having a dimensional change perpendicular to the direction of motion of said diaphragm means for constricting said light path.

6. An arrangement for controlling exposure means in cameras as defined in claim 4 including lever means actuated by said electrophysical responsive means and linked to said diaphragm means for magnifying said dimensional change of said electrophysical responsive means and positioning said diaphagm means as a function of said dimensional change.

7. The arrangement for controlling the exposure means in cameras as defined in claim 4 wherein said electrophysical responsive means includes two flexible strips made of material having different magnetostrictive properties.

8. The arrangement for controlling the exposure means in cameras as defined in claim 4 wherein said electrophysical responsive means is of material having magnetostrictive properties whereby said electrophysical responsive means incurs said dimensional change when a magnetic field is applied to said electrophysical responsive means.

9. The arrangement for controlling the exposure means in cameras as defined in claim 4 wherein said electrophysical responsive means is of material having electrostrictive properties whereby said electrophysical responsive means incurs a dimensional change when an electrical voltage is applied to said electrophysical responsive means.

10. The arrangement for controlling the exposure means in cameras as defined in claim 4, wherein said diaphragm means includes at least one movable blade member mechanically linked to said electrophysical responsive means for constricting said light path.

11. The arrangement for controlling the exposure means in cameras as defined in claim 4 including a light-sensitive circuit element in said circuit means for producing an electrical current as a function of the light within said light path.

References Cited
UNITED STATES PATENTS

| | | | |
|---|---|---|---|
| 3,082,674 | 3/1963 | Bagby | 95—64 |
| 3,295,428 | 1/1967 | Nerwin | 95—10 |
| 3,295,429 | 1/1967 | Stimson | 95—64 |
| 3,357,120 | 12/1967 | Pennington. | |
| 3,407,401 | 10/1968 | Frobach et al. | 350—269 XR |
| 3,447,862 | 6/1969 | Elpern | 350—266 XR |

NORTON ANSHER, Primary Examiner

D. S. STALLARD, Assistant Examiner

U.S. Cl. X.R.

95—10; 350—269